(12) United States Patent
Pudar et al.

(10) Patent No.: US 10,569,739 B2
(45) Date of Patent: *Feb. 25, 2020

(54) VIRTUAL KEYFOB FOR VEHICLE SHARING

(71) Applicant: GM GLOBAL TECHNOLOGY OPERATIONS LLC, Detroit, MI (US)

(72) Inventors: Nikola J. Pudar, Farmington Hills, MI (US); Robert A. Hrabak, Sterling Heights, MI (US); Amanda J. Kalhous, Ajax (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,456

(22) Filed: Aug. 12, 2019

(65) Prior Publication Data

US 2019/0359173 A1 Nov. 28, 2019

Related U.S. Application Data

(63) Continuation of application No. 14/596,621, filed on Jan. 14, 2015, now Pat. No. 10,384,643.

(51) Int. Cl.
*B60R 25/20* (2013.01)
*G07C 9/00* (2020.01)
*G07B 15/00* (2011.01)
*B60R 25/24* (2013.01)

(52) U.S. Cl.
CPC .......... *B60R 25/209* (2013.01); *B60R 25/24* (2013.01); *G07B 15/00* (2013.01); *G07C 9/00571* (2013.01); *B60R 2325/101* (2013.01); *B60R 2325/108* (2013.01); *B60R 2325/205* (2013.01)

(58) Field of Classification Search
CPC . B60R 25/209; B60R 25/24; B60R 2325/101; B60R 2325/108; B60R 2325/205; G07C 9/00571; G07B 15/00
See application file for complete search history.

(56) References Cited

U.S. PATENT DOCUMENTS

| 8,947,202 | B2 | 2/2015 | Tucker et al. |
| 9,120,452 | B2 | 9/2015 | Nishimoto et al. |
| 9,351,102 | B2 | 5/2016 | Tucker et al. |
| 10,384,643 | B2 | 8/2019 | Pudar et al. |
| 10,384,644 | B2 | 8/2019 | Pudar et al. |
| 2002/0135466 | A1 | 9/2002 | Bunyan |
| 2008/0136611 | A1* | 6/2008 | Benco ............ B60R 25/2018 340/426.3 |
| 2011/0167272 | A1 | 7/2011 | Kolesnikov |
| 2013/0259232 | A1 | 10/2013 | Petel |
| 2014/0277837 | A1 | 9/2014 | Hatton |
| 2015/0161832 | A1 | 6/2015 | Esselink et al. |
| 2016/0063786 | A1 | 3/2016 | Lewis et al. |
| 2016/0203661 | A1 | 7/2016 | Pudar et al. |
| 2016/0217635 | A1 | 7/2016 | Pudar et al. |

* cited by examiner

*Primary Examiner* — Ryan W Sherwin
(74) *Attorney, Agent, or Firm* — Reising Ethington P.C.; David Willoughby

(57) ABSTRACT

A system and method of managing virtual vehicle keys includes: receiving at a central facility a request to use a vehicle; receiving an identifier of a handheld wireless device at the central facility; generating at the central facility a virtual vehicle key that permits vehicle access using the handheld wireless device; and wirelessly transmitting the virtual vehicle key to the handheld wireless device and a vehicle the handheld wireless device has authorization to access.

20 Claims, 3 Drawing Sheets

# VIRTUAL KEYFOB FOR VEHICLE SHARING

TECHNICAL FIELD

The present invention relates to controlling vehicle access and, more particularly to controlling access to vehicles among a plurality of users.

BACKGROUND

Vehicle access has traditionally been controlled by one or more physical vehicle keys. When a vehicle owner or user possesses the physical keys, the user could insert a key into a lock and unlock the vehicle doors or into an ignition and start the vehicle engine. As vehicle technology evolved, the vehicle keys remained physical but were implemented as passive devices that wirelessly communicated with the vehicle to provide access. The passive device include a wireless transmitter that the vehicle owner/user carries to gain access to the vehicle and its functionality. These mechanisms of regulating vehicle access involve physical possession of a dedicated key or device to operate the vehicle. While physical keys are reliable and effective, it may be inconvenient to deliver physical keys or devices to a person sharing a vehicle among more than one person.

SUMMARY

According to an embodiment of the invention, there is provided a method of managing virtual vehicle keys. The method includes receiving at a central facility a request to use a vehicle; receiving an identifier of a handheld wireless device at the central facility; generating at the central facility a virtual vehicle key that permits vehicle access using the handheld wireless device; and wirelessly transmitting the virtual vehicle key to the handheld wireless device and a vehicle the handheld wireless device has authorization to access.

According to another embodiment of the invention, there is provided a method of managing virtual vehicle keys. The method includes receiving at a vehicle a virtual vehicle key that grants access to one or more vehicle functions from a central facility; detecting a handheld wireless device at the vehicle via a short-range wireless communications signal; receiving the virtual vehicle key from the handheld wireless device; determining whether the virtual vehicle key received from the central facility matches the virtual vehicle key received from the handheld device; and granting or denying access to the vehicle based on the determination.

According to yet another embodiment of the invention, there is provided a method of managing virtual vehicle keys. The method includes receiving at a central facility a request to operate a vehicle included in a vehicle fleet along with a time window of operation; identifying a vehicle in the vehicle fleet available during the time window of operation; generating at the central facility a virtual vehicle key that permits access to the identified vehicle during the time window of operation using a handheld wireless device associated with the request; and wirelessly transmitting the virtual vehicle key to the handheld wireless device and the identified vehicle.

According to yet another embodiment of the invention, there is provided a method of managing virtual vehicle keys. The method includes generating a virtual vehicle key at a central facility that permits vehicle access using a handheld wireless device; wirelessly transmitting the virtual vehicle key from the central facility to a vehicle; associating the virtual vehicle key with the vehicle at the central facility; afterwards, receiving at the central facility a request to use a vehicle; receiving an identifier of a handheld wireless device at the central facility; generating at the central facility a copy of the virtual vehicle key; and wirelessly transmitting the copy of the virtual vehicle key to the handheld wireless device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
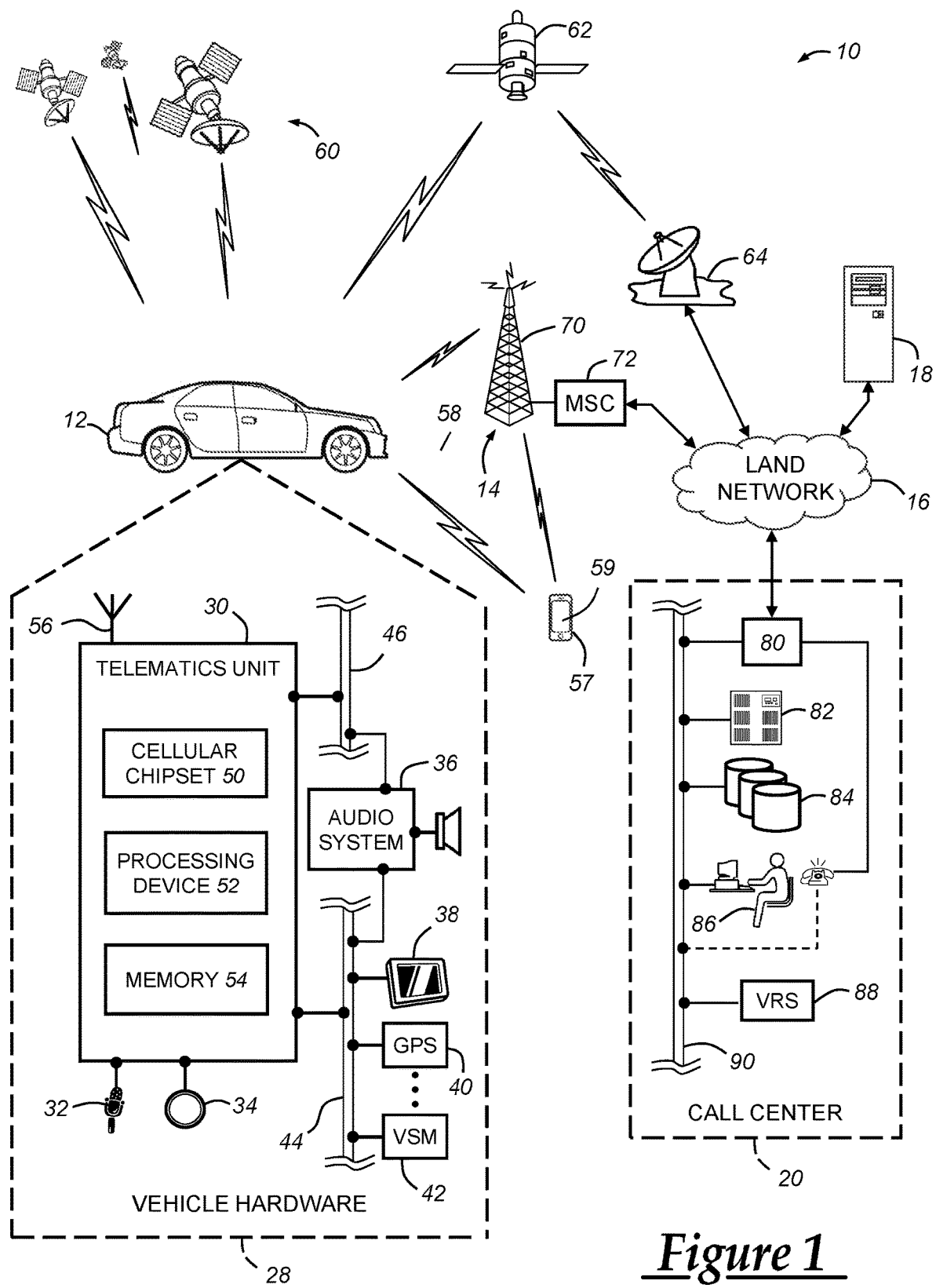
FIG. 1 is a block diagram depicting an embodiment of a communications system that is capable of utilizing the method disclosed herein.

The system and method described below manages virtual vehicle keys that provide vehicle access to handheld wireless devices without previously linking the devices with the vehicle. A central facility can receive a request for vehicle access from a user. After determining that the user is authorized to access the vehicle, the central facility can wirelessly transmit a virtual vehicle key to the vehicle as well as a handheld device carried by the user who will access the vehicle. Transmission of the virtual vehicle keys can be carried out in a secure manner, such as through encryption or virtual private network. The virtual vehicle key may have customized levels of access and duration for providing access.

Virtual vehicle keys can provide vehicle access to one or a fleet of vehicles among a group of potential vehicle users without providing those users physical keys. Traditionally, users of vehicles belonging to a vehicle fleet reserved vehicles, visited a central office where physical keys (i.e., a key a user held) were stored, retrieved a physical key for the particular vehicle to be used, and returned the physical key when finished. But key storage organized in this way limited the location of vehicle exchanges to a central office holding the physical keys. Also, potential vehicle owners accessed vehicles only when the central office was staffed with personnel to provide physical keys.

In contrast, virtual vehicle keys can be provided to vehicle users and vehicles without regard to their location or the time of day. A potential vehicle user can request a vehicle from the central facility and specify a time period during which the vehicle will be used. The central facility can identify a vehicle that is available during the time period the vehicle user requested and determine the location of that vehicle. A virtual vehicle key that provides access to the identified vehicle during the time period can be created and wirelessly transmitted in a secure manner to the vehicle as well as a handheld device belonging to the vehicle user. The central facility can provide directions to the vehicle along with the virtual vehicle key using the vehicle location. As the vehicle user approaches the vehicle with the handheld wireless device, the vehicle can authenticate the virtual vehicle key stored in the handheld wireless device. The vehicle and the handheld wireless device can exchange information securely without previously being paired. The virtual vehicle key can be securely deployed to both the vehicle and the handheld device so that they both have a secret key. In this way, the vehicle and the handheld wireless device need not be previously paired in order to securely communicate with each other. If the virtual vehicle key in the handheld device matches the virtual vehicle key stored at the vehicle, the vehicle can allow the vehicle user to access and operate the vehicle. When the time period granted for vehicle use expires, the virtual vehicle keys can be erased from the handheld wireless device and the vehicle.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, bicycles, e-bikes, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and 4G LTE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a handheld wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. as well as others. These and other similar devices may be used or considered as a type of handheld wireless device for the purposes of the method described herein. While the smart phone 57 is described with the methods below, it should be appreciated that other similar and/or simpler handheld wireless device can be successfully substituted for the smart phone 57 to carry out the method/system described herein. For instance, devices such as the iPad™ or iPod Touch™ can also use the short-range wireless protocols to communicate despite not having the capability to communicate via cellular protocols.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing and another VSM 42 can be a powertrain control module that regulates operation of one or more components of the vehicle powertrain. Yet another VSM 42 can be a body control module (BCM) that governs various electrical components located throughout the vehicle, like the vehicle's power door locks, engine ignition, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

A passive entry passive start (PEPS) module 43 is another type of VSM that can be connected to the vehicle bus 44 and provide passive detection of the absence or presence of a passive physical key or a virtual vehicle key. The PEPS module 43 can use its own antenna or receive signals via antenna 56. When the passive physical key or smart phone 57 with virtual vehicle key approaches, the PEPS module 43 can determine if the passive physical key belongs to the vehicle 12 and/or (in some embodiments) determine if the virtual vehicle key is authorized/authentic. If the virtual vehicle key is authentic, the PEPS module 43 can send a command to the BCM permitting access to the vehicle 12. In other implementations, it is possible for the BCM to carry out the functionality attributed to the PEPS module 43. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or digital technologies such as CDMA (e.g., CDMA2000) and GSM/GPRS as well as 4G LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
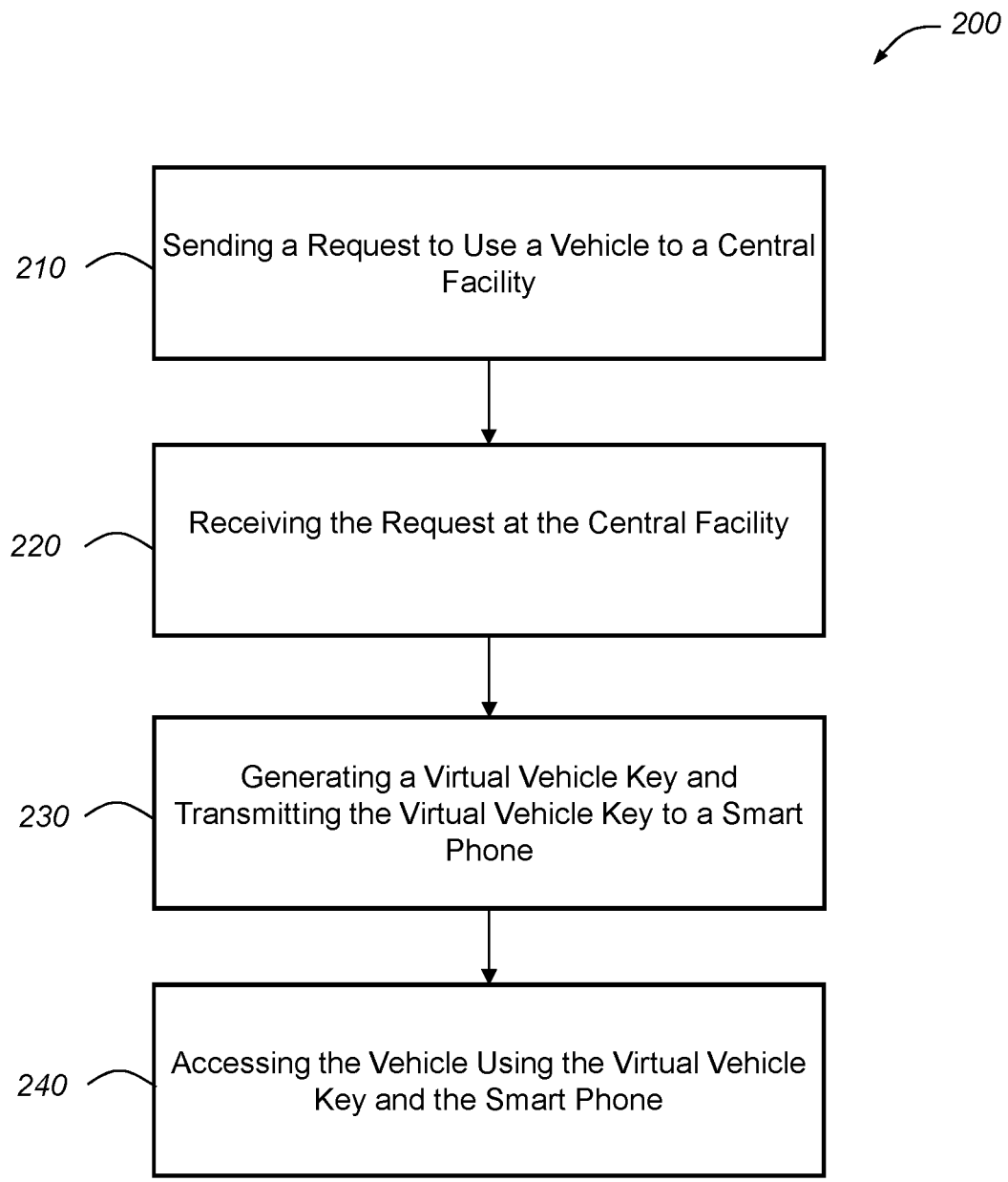
FIG. 2 is a flow chart depicting an embodiment of a method of managing virtual vehicle keys.

Turning now to FIG. 2, there is shown an embodiment of a method 200 of managing virtual vehicle keys. The method 200 begins at step 210 by sending to a central facility a request to use the vehicle 12. A vehicle user can place the request to use the vehicle 12 using a personal computer (PC) or a handheld wireless device, such as a smart phone 57. The request can identify the vehicle user, such as by a handheld wireless device identifier, and include a time window of operation. For example, the vehicle user can identify the day that the user plans to use a vehicle as well as the starting time of the use and ending time of the use. The handheld wireless device identifier and the time window of operation can be sent to the central facility. The handheld wireless device identifier can be implemented using a user ID, a mobile dialed number, an international mobile subscriber identifier (IMSI), a Bluetooth Device Address (BDADDR), or other similar unique value. It is possible to prompt the vehicle user to enter the handheld wireless device identifier as part of requesting the vehicle 12, but in other implementations the identifier can be automatically obtained by the smart phone 57 from its internal memory. In the implementation described with respect to method 200, the handheld wireless device and central facility will be described in terms of the smart phone 57 and computer 18, respectively, but it should be appreciated that the method 200 described herein can be implemented using other system hardware.

In one example of a vehicle user requesting to use a vehicle 12, the user can input the MDN of the smart phone 57 (e.g., 313-555-1212) and a desired time window of operation (e.g., November 22 from 3 PM to 4 PM) into a graphical user interface (GUI) shown on the smart phone display 59. The GUI can be a visual template presented by a web browser or an application-specific software application resident on the smart phone 57. The application-specific software applications are often simply referred to as "apps" and can be obtained by the smart phone 57 from a third-party software repository (e.g., an "app store"). Once generated and presented, the vehicle user can populate the GUI with the MDN and time window of operation. In some implementations, the location of the vehicle user can be included as part of the request. The vehicle user could enter their present location or location they plan to be at the time the time window of operation begins into the GUI. But it is also possible that the smart phone 57 can detect the vehicle user's current location. The method 200 proceeds to step 220.

At step 220, the request to use the vehicle 12 is received at the central facility. There the computer 18, can determine whether or not the vehicle user is authorized to use the vehicle. This can be implemented in a variety of ways, such as by determining if he vehicle user has a valid driver's license, has a valid credit card, and/or has permission from a vehicle owner to use the vehicle 12. In an implementation in which the vehicle 12 belongs to a fleet of vehicles, the computer 18 can determine a subset of the fleet that are available during the requested time window of operation. For example, the computer 18 can manage the use of a fleet of 350 vehicles and determine that 245 of those vehicles will be available during the requested time window of operation. The computer 18 can select one of those vehicles using a vehicle identifier and assign it to the vehicle user for use during the requested time window of operation. As vehicles are requested and used, the computer 18 can determine the identities of the vehicles currently in use (and therefore unavailable) and monitor upcoming time windows of operation that are associated with vehicles in the fleet to understand which vehicles are available at any particular time. The method 200 proceeds to step 230.

At step 230 a virtual vehicle key that permits vehicle access using the smart phone 57 is generated at the computer 18 and wirelessly transmitted to the smart phone 57 and the vehicle 12 the smart phone 57 has authorization to access. The virtual vehicle key can be an encryption key that grants access to the vehicle 12 during the time window of operation and replaces physical keys. Virtual vehicle keys are digital keys that include some amount of data and/or an algorithm that can be read by a computer. In one implementation, advanced encryption standard (AES) is used to create the virtual vehicle key in the form of a 128 bit AES key. The AES key, a nonce, and a token can be wirelessly transmitted from the computer 18 to the vehicle 12 that receives these elements using the vehicle telematics unit 30. A copy of the AES key, the nonce, and the token can also be sent to the smart phone 57. While the virtual key in this embodiment has been encrypted using AES, other encryption mechanisms could be used instead of AES. For example, Data Encryption Standard (DES), RSA, Diffie-Helmann (DH), ElGamal, and block ciphers are other examples of encryption techniques or mechanisms that can be used.

The virtual vehicle key and its copy can be securely transmitted between the computer 18, the vehicle 12, and the smart phone 57 using a number of encryption techniques, such as a virtual private network (VPN) or secure socket layer (SSL) encryption. Other encryption mechanisms are possible as well. The GPS location of the vehicle 12 can be sent to the smart phone 57 along with copies of the AES key, nonce, and token. The smart phone 57 can use the GPS location of the vehicle 12 to generate navigational directions from the vehicle user who carries the smart phone 57 to the vehicle 12 that will be used. The validity of the vehicle virtual key can permit access to the identified vehicle during the time window of operation using a handheld wireless device or smart phone 57 associated with the request The method 200 proceeds to step 240.

At step 240, the vehicle user can access the vehicle 12 during the time window of operation once the virtual vehicle key is received by both the vehicle 12 and the smart phone 57. The vehicle 12 can authorize the smart phone 57 via a short-range wireless communications protocol, such as the Bluetooth Low Energy (BLE) protocol. A BLE transceiver used at the vehicle 12 can detect a short-range wireless communication signal transmitted from the smart phone 57 using the BLE protocol. When both the vehicle 12 and the smart phone 57 have virtual vehicle keys, the vehicle 12 can authenticate the smart phone 57 and allow the vehicle user carrying the smart phone 57 to access the vehicle 12.

The BLE transceiver can detect the presence of the smart phone within a particular range of the vehicle, such as 100 meters. Once the smart phone 57 enters the vehicle range, the vehicle 12 can use the BLE protocol to initiate a communication session with the smart phone 57. The initial BLE communication can originate from the smart phone 57 or the vehicle 12 as a directed advertisement. For example, the vehicle 12 can be provided the handheld wireless device identifier ahead of time such that the vehicle 12 can establish a directed advertisement received only by the smart phone 57 identified by the handheld wireless device identifier. The authentication process can then begin by encrypting the virtual vehicle key (e.g., the AES key, the nonce, and the token) at the smart phone 57 and communicating it to the vehicle 12 over the short-range wireless link using BLE. In this implementation, the virtual vehicle key can be encrypted using Counter Mode Cipher Block Chaining Message Authentication Code Protocol, Counter Mode (CBC-MAC or CCM) that may implement a counter for the nonce or token sent with the AES key. The AES keys, the nonce, and the token can be of various size, but in one implementation they are 16 bytes, 12 bytes, and 4 bytes, respectively.

A vehicle command can also be included with this transmission as well. Vehicle commands include commands to unlock/lock doors, activate/deactivate vehicle lights, activate/deactivate an audible vehicle alarm, or to start the engine of the vehicle. After receiving the virtual vehicle key and the vehicle command, the vehicle 12 can then decrypt and authenticate what it receives using its own virtual vehicle key. If the virtual vehicle key is determined by the vehicle 12 to be authentic, then the vehicle 12 can carry out the vehicle command; otherwise, the vehicle 12 can ignore the smart phone 57 and/or delete the virtual vehicle key it received. When authenticated, the presence of the smart phone 57 in the vehicle 12 can act as a passive vehicle key permitting vehicle operation and access. In addition, the vehicle 12 can respond to the smart phone 57 confirming that it has been authenticated. The response can include an updated nonce and a new token that are encrypted at the smart phone 57 and transmitted to the smart phone 57 using the BLE protocol. The nonce and the token can be updated after each communication between the vehicle 12 and the smart phone 57. In one implementation, the nonce can be advanced based on a counter in the vehicle 12 or the smart phone 57.

The method 200 may also provide vehicle access to the vehicle user despite an inability for the vehicle 12, the smart phone 57, or both to receive the virtual vehicle key as well as when the vehicle 12 and the smart phone 57 are unable to communicate with each other via the short-range wireless communication link. When the computer 18 is unable to deploy the virtual vehicle key to the vehicle 12, the vehicle 12 can be instructed to use one of a number of virtual vehicle keys pre-stored at the vehicle 12. The vehicle 12 can maintain a number of pre-stored virtual vehicle keys that can be used when the computer 18 is unable to transmit a virtual vehicle key that is associated with the time window of operation. After determining that it was unable to send the virtual vehicle key to the vehicle 12, the computer 18 can access a locally-stored file containing the pre-stored virtual vehicle keys associated with the vehicle 12. These pre-stored keys can be maintained both at the vehicle 12 and at the computer 18. One of the pre-stored virtual vehicle keys is selected at the computer 18 and wirelessly sent to the smart phone 57. As the smart phone 57 approaches the vehicle 12, the vehicle 12 can recognize the pre-stored key the vehicle 12 already has and grant access to the smart phone 57 as is described above. The pre-stored virtual vehicle keys can be replaced in both the vehicle 12 and the computer 18 on a regular basis, such as every week or month. By replacing or recycling the pre-stored virtual vehicle keys maintained at the vehicle 12, an increased level of security can be realized.

At least one of the pre-stored virtual vehicle keys stored in the vehicle 12 can also be configured to permit vehicle access by a fleet manager or other individual who manages a plurality of vehicles 12. One of the pre-stored virtual vehicle keys can be designated a master key that allows one individual access to more than one vehicle 12. The master key can be configured to allow individualized levels of vehicle access. For example, the master key can be configured to permit a fleet manager to unlock and lock vehicle doors but not to start the vehicle 12. In addition, the master key can be configured to monitor how a fleet manager accesses the vehicles 12. In one example, access of the vehicle 12 using the master key can include an instruction wirelessly transmitted from the smart phone 57 to the vehicle 12 via short-range wireless communication techniques as discussed above that causes the vehicle 12 to wirelessly transmit a message to the computer 18. The message from the vehicle 12 to the computer 18 can identify the fleet manager or the master key used, the time the vehicle was accessed, and/or the type of access the fleet manager was granted (e.g., unlocking/locking, moving the vehicle 12, etc.). The vehicle 12 can wirelessly transmit the message in response to a vehicle ignition cycle or other periodic vehicle function. It is also possible to wirelessly transmit the message on a periodic time basis (e.g., once a day).

Other possible difficulties could occur with respect to short-range wireless communications between the vehicle 12 and the smart phone 57. For example, if the BLE transceiver of the vehicle 12 were unable to communicate with the smart phone 57 located nearby, the vehicle user could contact the computer 18 using the smart phone 57. If the computer 18 can authenticate the smart phone 57, the computer 18 can receive vehicle commands from the smart phone 57 and relay those commands to the vehicle 12 via the wireless carrier system 14.

Beyond inabilities to communicate, the method 200 may have to compensate for vehicle users who extend their usage beyond the time period of operation. For example, the time period of operation may start at 8:00 AM and end at 10:00 AM yet the vehicle user is still operating the vehicle 12 at 10:10 AM. If this occurs, the computer 18 can extend the time window of operation beyond the 10:00 AM end time in discrete amounts (e.g., 15 minute extensions). The discrete amounts can have an ultimate cap (e.g., one hour) at which time the computer 18 can wirelessly send a command to the vehicle 12 that ends access by the vehicle user. This ultimate ending of access by the vehicle user could be implemented after the user stops the engine of the vehicle 12.

After the time period of operation has expired and the vehicle user has stopped using the vehicle 12, the virtual vehicle keys can be erased from both the vehicle 12 and the smart phone 57. The computer 18 can wirelessly transmit a command to the vehicle 12 and the smart phone 57 instructing them to erase the virtual vehicle keys. Or it is also possible to include an instruction with the virtual vehicle key that deletes the virtual vehicle key after the vehicle user has stopped using the vehicle 12, such as by turning off the engine, and the time window of operation has passed. The vehicle 12 can wirelessly transmit its GPS location to the computer 18 that can then identify the vehicle 12 as being available for another vehicle user. The method 200 ends.

Figure 3:
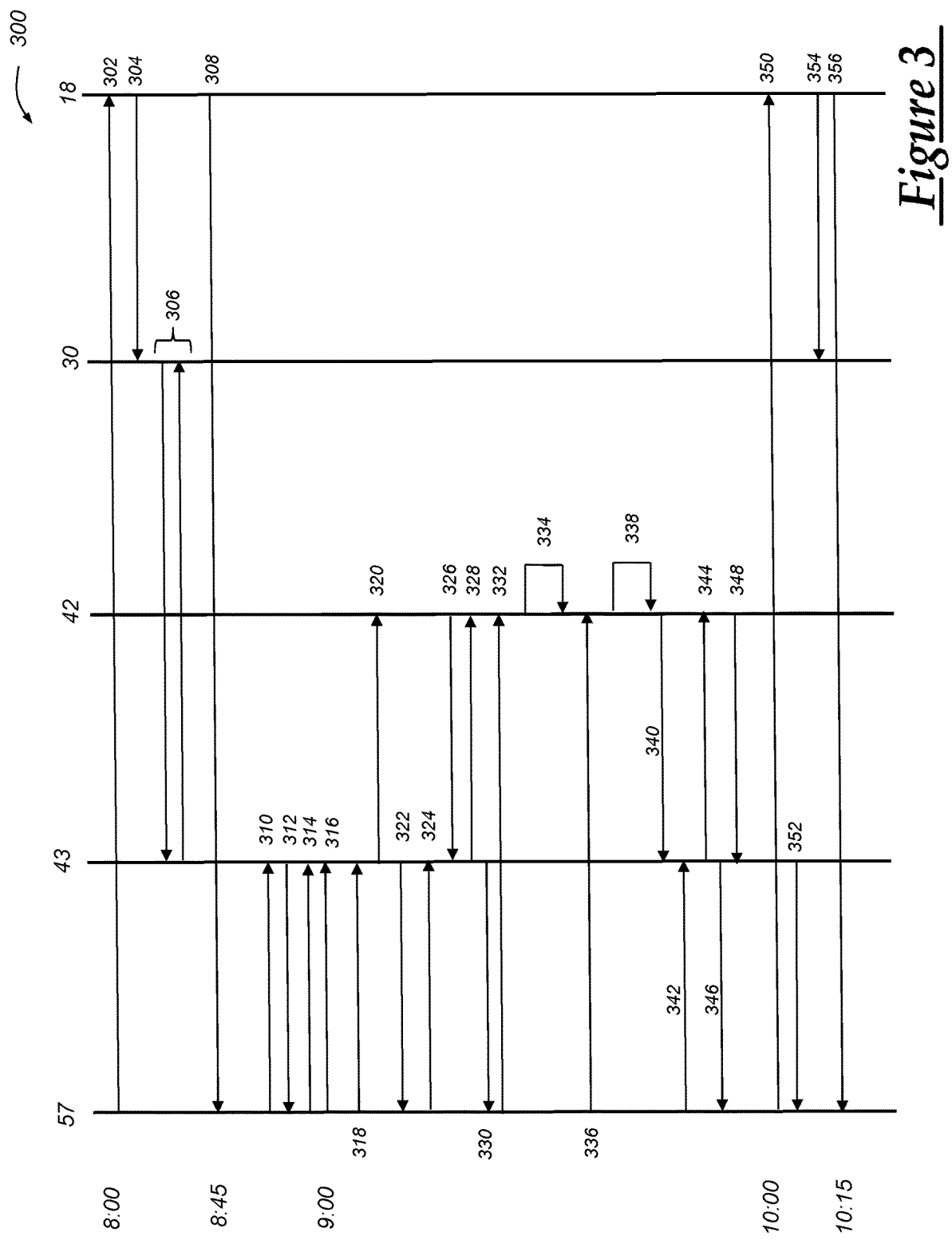
FIG. 3 is a call flow depicting an embodiment of a method of managing virtual vehicle keys.

Turning to FIG. 3, an exemplary call flow 300 is shown involving the management of virtual vehicle keys along with a time window of operation. The call flow begins at step 302 when a vehicle user sends a request to use a vehicle 12 to the computer 18 via the smart phone 57 before the time window of operation begins. The request can include the handheld wireless device identifier as well as the time window of operation—in this example, 9:00-10:00 AM. The computer 18 can respond at step 304 by generating a virtual vehicle key including an AES key, a nonce, and a token and sending the virtual vehicle key to the vehicle telematics unit 30 of the vehicle 12 to be used along with the handheld wireless device identifier. The vehicle telematics unit 30 can then send the virtual vehicle key to the PEPS module 43, which confirms receipt of the key to the unit 30 during step 306. The computer 18 can also wirelessly send the virtual vehicle key to the smart phone 57 with a GPS location of the vehicle 12 at step 308 before the time window of operation begins.

The vehicle 12 can be provided the handheld wireless device identifier ahead of time such that the vehicle 12 can generate a directed advertisement using the PEPS module 43 received only by the smart phone 57 identified by the handheld wireless device identifier. The smart phone 57 can wirelessly transmit the handheld wireless device identifier to the vehicle 12 during step 310. In this implementation, the PEPS module 43 can authenticate the smart phone 57 (step 312) using the handheld wireless device identifier it was provided. As the vehicle user approaches the vehicle 12 at the beginning of or during the time window of operation, the smart phone 57 carried by the vehicle user can establish a communication session with the PEPS module 43 using BLE at step 314. The vehicle user can be near the vehicle 12 with the smart phone 57 and attempt to open a vehicle door (step 316). The PEPS module 43 can then receive the virtual vehicle key from the smart phone 57 and authenticate the vehicle user (step 318). In this implementation, the virtual vehicle key can be sent using BLE and AES CCM. Once authentication of the virtual vehicle key is complete, the PEPS module 43 can instruct the BCM module/VSM 42 to unlock the doors (step 320). The PEPS module 43 can advance a counter used to generate the nonce of the virtual vehicle key and transmit a new virtual vehicle key having a new nonce and a new token (step 322).

Once the vehicle user has entered the vehicle 12, the vehicle user can start the vehicle engine to begin operating the vehicle 12. To enable the vehicle user to do so, the smart phone 57 can transmit its virtual vehicle key to the PEPS module 43 for authentication during step 324. The BCM module 42 can query the PEPS module 43 to determine if the smart phone 57 is located in the vehicle 12 based on the short-range wireless connection using BLE during step 326. If the PEPS module 43 determines that the smart phone 57 is present, the PEPS module 43 can confirm this to the BCM 42 (step 328). The module 43 can transmit a virtual vehicle key (having a new nonce and token) to the smart phone 57 along with a confirmation that access to the vehicle 12 is allowed (step 330). The vehicle user can press a start/stop button to start the vehicle engine (step 332) that is received by the BCM 42, which activates the vehicle engine (step 334). The vehicle engine is enabled until the vehicle user pushes the vehicle start/stop button (step 336) and the BCM 42 disables the vehicle engine (step 338).

When the vehicle user exits the vehicle 12, the BCM 42 can detect that the door handle is used at step 340 and communicate this to the PEPS module 43. The PEPS module 43 can receive the virtual vehicle key at step 342 authenticating the smart phone 57 to the PEPS module 43 followed by a command from the vehicle user via the smart phone 57 to lock the door (step 344). The PEPS module 43 can advance a counter used to generate the nonce of the virtual vehicle key and transmit a new virtual vehicle key having a new nonce, a new token (step 346). Once authentication of the virtual vehicle key is complete, the PEPS module 43 can instruct the BCM module/VSM 42 to lock the doors (step 348). After 10:00 AM passes, access to the vehicle 12 by the vehicle user ends (step 350) and the smart phone 57 confirms this to the computer 18. The PEPS module 43 can ensure that the vehicle user has left the vehicle and that the vehicle is not moving (step 352). The vehicle telematics unit 30 can erase the virtual vehicle key from the PEPS module 43 as well as any other memory location in the vehicle in response to an instruction from the computer 18 at step 354 and the computer 18 can wirelessly send a command to the smart phone 57 directing it to erase its copy of the virtual vehicle key at step 356. The call flow 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing virtual vehicle keys, comprising the steps of:
   (a) receiving at a central facility from a handheld wireless device a request to use a vehicle;
   (b) receiving at the central facility from the handheld wireless device an identifier of the handheld wireless device, wherein the identifier is unique to the handheld wireless device or unique to a user of the handheld wireless device, and wherein the identifier of the handheld wireless device is stored on the handheld wireless device prior to step (a);
   (c) generating at the central facility a virtual vehicle key that permits access to the vehicle using the handheld wireless device;
   (d) wirelessly transmitting the virtual vehicle key to the handheld wireless device; and
   (e) granting the handheld wireless device access to the vehicle in response to: (i) the vehicle receiving from the handheld wireless device an identifier of the handheld wireless device; (ii) the vehicle establishing a secured short-range wireless communication (SRWC) connection with the handheld wireless device in response to the successful authentication of the handheld wireless device; and (iii) the handheld wireless device thereafter sending the virtual vehicle key to the vehicle using the secured SRWC connection.

2. The method of claim 1, wherein the vehicle is one of a plurality of vehicles included in a vehicle fleet.

3. The method of claim 1, wherein the handheld wireless device further comprises a smart phone.

4. The method of claim 1, wherein the virtual vehicle key further comprises a nonce and a token.

5. The method of claim 1, wherein the virtual vehicle key uses advanced encryption standard (AES) encryption.

6. The method of claim 1, wherein the handheld wireless device is configured to:
   encrypt the virtual vehicle key at the handheld wireless device;
   initiate a short-range wireless communication session between the vehicle and the handheld wireless device; and
   wirelessly transmit the encrypted virtual vehicle key between the vehicle and the handheld wireless device.

7. The method of claim 6, wherein the handheld wireless device is configured to:
   initiate the short-range wireless communication session via Bluetooth Low Energy (BLE) protocol.

8. The method of claim 6, wherein the handheld wireless device is configured to authenticate the virtual vehicle key using a passive entry passive start (PEPS) module.

9. The method of claim 1, wherein the virtual vehicle key is a master key providing access to more than one vehicle that is also pre-stored at the vehicle.

10. A method of managing virtual vehicle keys, comprising the steps of:
   (a) receiving at a central facility a request to operate a vehicle included in a vehicle fleet along with a time window of operation;
   (b) identifying a vehicle in the vehicle fleet available during the time window of operation;
   (c) generating at the central facility a virtual vehicle key that permits access to the identified vehicle during the time window of operation using a handheld wireless device associated with the request; and
   (d) wirelessly transmitting the virtual vehicle key to the handheld wireless device, wherein the identified vehicle is configured to:
   automatically detect the presence of the handheld wireless device within a particular range of the vehicle using the PEPS module;
   in response to the automatic detection of the presence of the handheld wireless device within the particular range of the vehicle, receive a wireless signal that includes the virtual vehicle key from the handheld wireless device at the PEPS module;
   grant the handheld wireless device access to the identified vehicle in response to verifying at the PEPS module the virtual vehicle key received from the handheld wireless device;
   after granting the handheld wireless device access to the identified vehicle, determine whether the handheld wireless device is located in the vehicle based on one or more short-range wireless communications (SRWC) carried out between the PEPS module and the handheld wireless device; and
   permit one or more vehicle operations to be carried out using a body control module (BCM) based on whether the handheld wireless device is located in the vehicle, wherein at least one of the one or more vehicle operations are permitted to be carried out by sending at least a nonce and a token from the PEPS module to the handheld wireless device in response to determining that the handheld wireless device is located in the vehicle.

11. The method of claim 10, wherein the handheld wireless device is configured to:
encrypt the virtual vehicle key at the handheld wireless device;
initiate a short-range wireless communication session between the identified vehicle and the handheld wireless device; and
wirelessly transmit the encrypted virtual vehicle key between the identified vehicle and the handheld wireless device.

12. The method of claim 10, wherein the handheld wireless device is configured to:
initiating the short-range wireless communication session via Bluetooth Low Energy (BLE) protocol.

13. The method of claim 10, wherein the virtual vehicle key uses advanced encryption standard (AES) encryption.

14. A server for providing virtual vehicle keys, comprising at least one processor and memory storing programming that, when executed by the one or more processors, causes the server to:
(a) receive a request to use a vehicle;
(b) receive an identifier of a handheld wireless device from the handheld wireless device;
(c) determine whether the handheld wireless device is authorized to access the vehicle based on the identifier;
(d) generate a virtual vehicle key that permits the handheld wireless device to access the vehicle; and
(e) wirelessly transmit the virtual vehicle key to the handheld wireless device;
wherein the vehicle is configured to:
automatically detect the presence of the handheld wireless device within a particular range of the vehicle using the PEPS module;
in response to the automatic detection of the presence of the handheld wireless device within a particular range of the vehicle, receive the identifier of the handheld wireless device from the handheld wireless device via short-range wireless communications (SRWC); and
in response to authenticating the handheld wireless device, receive a wireless signal that includes the virtual vehicle key from the handheld wireless device at the PEPS module.

15. The server of claim 14, wherein the virtual vehicle key further comprises a nonce and a token.

16. The server of claim 14, wherein the virtual vehicle key is a master key providing access to more than one vehicle.

17. The server of claim 14, wherein the processor is further programmed to identify an available subset of one or more vehicles from a fleet of vehicles and select one of the subset for access.

18. The server of claim 14, wherein the processor is further programmed to receive a global positioning system (GPS) location of the vehicle and wirelessly transmit the GPS location along with the virtual vehicle key to the handheld wireless device.

19. The server of claim 14, wherein:
step (a) further comprises a request to operate a vehicle included in a vehicle fleet and receiving a time window of operation for which the vehicle is being requested;
step (c) further comprises identifying a vehicle in the vehicle fleet available during the time window of operation; and
step (d) further comprises generating a virtual vehicle key that permits the handheld wireless device to access the identified vehicle only during the time window of operation.

20. The server of claim 19, further comprising, following step (e), the steps of detecting that the identified vehicle is being used by a user having the handheld wireless device past the time window of operation and, in response to the detection, extending the time window of operation so that the user is able to continue using the handheld wireless device to access the vehicle for an additional amount of time.

* * * * *